Patented Jan. 26, 1943

2,309,509

UNITED STATES PATENT OFFICE 2,309,509

PROCESS FOR THE PREPARATION OF DI-AMINES FROM KETONITRILES AND PRODUCTS THEREOF

Benjamin W. Howk and George W. Rigby, Wilmington, Del., assignors to E. I. du Pont de Nemours & Company, Wilmington, Del., a corporation of Delaware No Drawing. Application October 13, 1939, Serial No. 299,261

7 Claims. (Cl. 260—583)

This invention relates to the conversion of keto acids to amines, and particularly to the corresponding diamines.

The literature contains many references to laborious and inefficient methods for preparing diamines. Among these the sodium-alcohol reduction of dinitriles, the hypochlorite degradation of diamides, and the reaction of dihalides with ammonia may be mentioned as typical. For commercial operation these prior art methods are impractical because of high reagent costs, commercial inaccessibility of raw materials, difficulties in proper control of the reactions, and because in every instance recovery of the desired diamines from the reaction mixtures presents serious and laborious problems. In U. S. Patent 2,166,151 which issued on July 18, 1938, to Benjamin W. Howk, there is disclosed a process for the catalytic hydrogenation of adiponitrile to hexamethylenediamine. Even though this is the first practical method for preparing diamines it is limited to the preparation of diprimary amines, since reduction of a CN group always leads to an amine group attached to a primary carbon atom.

This invention has as one object the preparation of amines from keto acids. Another object is the preparation of long-chain diamines. Still another object is to provide a new and improved method for the preparation of open-chain diamines in which one of the amino groups is attached to a secondary and one to a primary carbon atom, the two being separated by a chain of at least 5 carbon atoms in contiguous relation. A further object is to provide a new and improved method for preparing long-chain diamines from keto nitriles. Other objects will be apparent from a reading of the following description of the invention.

The above objects are accomplished by the following invention which comprises reacting a keto acid with ammonia at an elevated temperature in the presence of a dehydration catalyst and then catalytically hydrogenating the resulting keto nitrile in the presence of ammonia to the corresponding diamine. If the diamine is desired, and ring closure is to be avoided in the hydrogenation step, it is necessary that the compound have a chain of at least 5 carbon atoms in contiguous relation between the keto and nitrile groups.

The following examples set forth certain well-defined instances of the application of this invention and are not to be considered as limitations thereof, since many modifications may be made without departing from the spirit and scope of this invention. Parts are by weight, unless otherwise stated.

*Example I*

A. 12-ketostearin was obtained from hydrogenated castor oil by dehydrogenation with nickel-on-kieselguhr catalyst at a temperature of 160° to 275° C. during about 4 hrs. The material thus obtained was recrystallized from a mixture of acetone and benzene. The product had a saponification number of 302 and a carbonyl number of 164. Hydrolysis of this ketostearin yielded 12-ketostearic acid which was purified by recrystallization from 50% aqueous acetone, M. P. 81° C.

Three hundred ninety parts by weight of 12-ketostearic acid (obtained by the process described above) was vaporized and passed at 360° C. with 133 parts (6 molecular equivalents) of ammonia, over a borophosphoric acid catalyst prepared as in Example I in copending application, Serial No. 232,529, filed September 20, 1938, by H. R. Arnold and W. A. Lazier. The product consisted of an oil layer amounting to 311 parts and an aqueous layer amounting to 75 parts. The oil was distilled through a laboratory distillation column. There was obtained 157 parts of 12-ketostearonitrile, B. P. 173° C. at 0.5 mm. Pure 12-ketostearonitrile is a colorless crystalline solid, M. P. 34.5° C. Analysis of the product gave carbon—77.96; hydrogen—12.34; nitrogen—5.50.

$C_{18}H_{33}NO$ requires carbon—77.80; hydrogen—11.90; nitrogen—5.0.

B. Hydrogenation of 100 parts of 12-ketostearonitrile (prepared as above) was carried out in the presence of 15 parts of cobalt-on-alumina catalyst with a mixture containing 75 parts of liquid ammonia and 1.0 part of ammonium chloride, using a total hydrogen pressure of 2500 lbs./sq. in. at 125° C. The product was dissolved in methanol, filtered to remove the catalyst, and distilled. After removing 6.8 parts of a foreshot boiling between 160° and 165° C. at 1.5 mm., 24.4 parts of 1-amino-12-hydroxyoctadecane, B. P. 164.5° to 180° C. at 1.5 mm. pressure, 63.6 parts 1,12-diaminooctadecane, B P. 182° C. at 1.5 mm. pressure, and 3.5 parts of residue were obtained. The yield of 1,12-diaminooctadecane was 62.5% of the pure diamine, a white crystalline solid, M. P. 32° C., which fumes in the air and readily absorbs carbon dioxide. Analysis of the product gave carbon—75.99; hydrogen—14.06; nitrogen—9.04.

$C_{18}H_{14}N_2$ requires carbon—76.0; hydrogen—14.12; nitrogen—9.85.

Example II

Three hundred parts of 12-ketostearic acid prepared according to the procedure of Example I was passed over a silica gel catalyst together with 102 parts (6 molecular equivalents) of ammonia at 450° C. The oily layer was separated and vacuum distilled at 0.66 mm. pressure. After removing a foreshot amounting to 64 parts, the main product, amounting to 100 parts, distilled at 168° C. at 0.65 mm. This corresponds to a yield of 36% based on the 12-ketostearic acid used.

One hundred fifty-four parts of 12-ketostearonitrile prepared by the above process was hydrogenated in the presence of 25 parts of liquid ammonia and 10 parts of a finely divided active nickel catalyst under 2000 lbs./sq. in. of hydrogen pressure at a temperature of 120° C. The product was filtered from the catalyst and subjected to vacuum distillation through an efficient laboratory column. The main product, which amounted to 22 parts, was 1,12-diaminooctadecane, and had a neutralization equivalent of 142.

In the foregoing examples there have been indicated specifically certain compounds and conditions of reaction. In the dehydration step any keto acid, ester, acid halide, amide, or anhydride which is not decomposed under the conditions of reaction may be used. If it is desired to avoid ring closure the acid should have at least 5 carbon atoms in contiguous relation between the keto group and the carbonyl group.

In place of the 12-ketostearic acid of the examples, there may be used any of the following acids: 12-ketopalmitic acid, 10-ketolauric acid, 11-ketomyristic acid, gamma-acetobutyric acid, beta-acetoacrylic acid, benzoylbenzoic acid, ketobrassylic acid, etc., or the corresponding amides, esters, anhydrides, or acid halides. In the hydrogenation step any of the ketronitriles corresponding to the above acids, levulinonitrile, etc., may be used.

The step of converting the keto acid to the keto nitrile is preferably carried out in the vapor phase at a temperature between 250° and 500° C. using an ammonia:acid molecular ratio of at least 1:1, and generally of about 16:1.

In the synthesis of the ketronitriles from the corresponding keto acids any dehydration catalyst may be used, such as the oxides and salts of elements of the 3d, 4th, 5th, 6th, and 8th groups of the periodic table. Among these may be mentioned the dehydrating oxides of aluminum, silicon, tungsten, etc. It is generally preferred to use a heteropoly acid catalyst, however, and of these the preferred catalyst is borophosphoric acid.

In the step of converting the keto nitrile to the amine, the reaction may be carried out in either the liquid or vapor phase. In general, the process is operative at temperatures ranging from 50° to 170° C. and at pressures varying from atmospheric to a maximum determined by the practical limitations of the reaction vessel. It is advisable, however, to maintain a pressure higher and a temperature lower than the corresponding critical values for ammonia, if this ingredient is used in the liquid state. It is preferred to operate the process at a temperature of 75° C. to 140° C. and under a total pressure of 1000 to 10,000 lbs./sq. in. The proportion of ammonia used may be varied considerably and will depend upon the particular keto nitrile hydrogenated. It is preferred to use a large excess of ammonia when operating in the liquid phase; generally the amount used is from 25% to 100% of the weight of the nitrile.

In conducting the hydrogenation reaction any hydrogenation catalyst may be used. It is preferred, however, to use a cobalt hydrogenation catalyst, particularly one of the type described in the copending application of Frank K. Signaigo, Serial No. 231,505, filed September 24, 1938. Other catalysts such as platinum, palladium, and the various types of nickel may be used for the hydrogenation of these nitriles. In addition it is advisable to use an imine-forming catalyst, such as an ammonium salt, to promote a suitable combination between the ketone group of the reactant and the ammonia solvent. Under these conditions maximum yields of the desired diamine are obtained.

This reaction differs considerably from the usual hydrogenation of a dinitrile to a diamine since the oxygen atom in the keto nitrile must be replaced by an imino (=NH) group before hydrogenation begins; otherwise, an hydroxy amine is produced. Ammonium chloride has been found to be particularly effective as an aid in the replacement of the keto group by an imino group; thus, comparing the yields of diamine obtained in Examples I and II this effect is brought out. Moreover, if open-chain diamines are the desired products, it is essential that the ketone and nitrile groups be separated by more than 5 carbon atoms in contiguous relation, for in the hydrogenation of levulinonitrile in the presence of ammonia, in which the ketone and nitrile groups are separated by a lesser number of carbon atoms, the main product obtained is methylpyrrolidine.

The products obtained according to this invention are useful as acid acceptors, and as resin modifying agents.

It is apparent that many widely different embodiments of this invention may be made without departing from the spirit and scope thereof and, therefore, it is not intended to be limited except as indicated in the appended claims.

We claim:
1. The process for the preparation of diamines from long chain keto acids in which the keto group is separated from the acid group by at least 5 carbon atoms in contiguous relation which comprises bringing the keto acid and ammonia at an elevated temperature between 250° and 500° C. into contact with a dehydration catalyst so as to convert the keto acid to a keto nitrile and then catalytically hydrogenating the keto nitrile in the presence of ammonia to the corresponding diamine.

2. The process in accordance with claim 1 characterized in that the hydrogenation reaction is carried out at a temperature between 50° and 170° C.

3. The process which comprises catalytically hydrogenating a long chain keto nitrile in which the keto group is separated from the nitrile group by at least 5 carbon atoms in contiguous relation while in contact with ammonia at a temperature between 50° and 170° C., to the corresponding diamine.

4. The process in accordance with claim 3 characterized in that the reaction is carried out in the presence of a cobalt hydrogenation cata- 5. The process which comprises reacting 12-ketostearic acid with ammonia in molecular excess in the vapor phase, at a temperature between 250° and 500° C., while in contact with a borophosphoric acid dehydration catalyst, and reacting the resulting ketostearonitrile in the liquid phase with hydrogen and ammonia, while in contact with a cobalt containing hydrogenation catalyst, at a temperature between 70° and 140° C., thereby obtaining 1,12-diaminooctadecane.

6. The process in accordance with claim 1 characterized in that the keto acid is 12-ketostearic acid.

7. The process in accordance with claim 3 characterized in that the long-chain ketonitrile is 12-ketostearonitrile.

BENJAMIN W. HOWK.
GEORGE W. RIGBY.